(12) United States Patent
Yu

(10) Patent No.: US 8,837,451 B2
(45) Date of Patent: Sep. 16, 2014

(54) METHOD AND SYSTEM FOR IMPLEMENTING A CALL BY A MEDIA GATEWAY

(75) Inventor: Xiaowen Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 237 days.

(21) Appl. No.: 13/518,004

(22) PCT Filed: Dec. 25, 2009

(86) PCT No.: PCT/CN2009/076068
§ 371 (c)(1),
(2), (4) Date: Jun. 24, 2012

(87) PCT Pub. No.: WO2011/075911
PCT Pub. Date: Jun. 30, 2011

(65) Prior Publication Data
US 2012/0250524 A1 Oct. 4, 2012

(51) Int. Cl.
*H04B 7/216* (2006.01)
*H04L 29/06* (2006.01)

(52) U.S. Cl.
CPC ........ *H04L 65/1043* (2013.01); *H04L 65/1023* (2013.01); *H04L 65/1069* (2013.01)
USPC ............................ 370/342; 370/242; 370/469

(58) Field of Classification Search
CPC .......... H04Q 2213/13145; H04Q 2213/13167; H04Q 2213/13176; H04Q 2213/13209; H04Q 2213/13296; H04Q 3/0045; H04W 76/02; H04W 76/04
See application file for complete search history.

(56) References Cited

U.S. PATENT DOCUMENTS

2003/0169768 A1 9/2003 Bienn
2003/0235187 A1* 12/2003 Iwama et al. ................. 370/352

(Continued)

FOREIGN PATENT DOCUMENTS

| CN | 1567775 A | 1/2005 |
|---|---|---|
| CN | 1980224 A | 6/2007 |

(Continued)

OTHER PUBLICATIONS

International Search Report in international application No. PCT/CN2009/076068, mailed on Oct. 8, 2010.

(Continued)

*Primary Examiner* — David Oveissi
(74) *Attorney, Agent, or Firm* — Oppedahl Patent Law Firm LLC

(57) ABSTRACT

The present disclosure discloses a method and a system for implementing a call by a media gateway, comprising: setting a master control network element in a media gateway cluster, and establishing a mapping relationship between a user number and the media gateway in the master control network element (100); when the media gateway determines that an uplink protocol interface corresponding to a calling party is interrupted, the media gateway transmits a dialing tone to the calling party and acquires the called party number, and requests the master control network element to determine a media gateway to which the called party belongs; the master control network element determines the media gateway to which the called party belongs according to the mapping relationship stored therein, and informs the media gateway initiating the request; the call between the media gateway as a calling gateway that initiates the request and the determined media gateway to which the called party belongs is completed (103). In the method of the present disclosure, under the help of the master control network element, normal conversation services of the users of the media gateway can be guaranteed even if the protocol service interface between the media gateway and the core network equipment is interrupted through the interactions among the media gateways in the media gateway cluster.

10 Claims, 3 Drawing Sheets

(56) References Cited

U.S. PATENT DOCUMENTS

| | | |
|---|---|---|
| 2004/0032862 A1* | 2/2004 | Schoeneberger et al. ..... 370/352 |
| 2004/0141508 A1* | 7/2004 | Schoeneberger et al. ..... 370/401 |
| 2005/0025043 A1 | 2/2005 | Mussman et al. |
| 2006/0126595 A1 | 6/2006 | Dahm et al. |
| 2006/0251052 A1 | 11/2006 | Croak et al. |
| 2007/0165607 A1 | 7/2007 | Mussman et al. |
| 2010/0157983 A1 | 6/2010 | Mussman et al. |

FOREIGN PATENT DOCUMENTS

| | | |
|---|---|---|
| CN | 101106612 A | 1/2008 |
| CN | 101163171 A | 4/2008 |
| EP | 1715651 A2 | 10/2006 |

OTHER PUBLICATIONS

English Translation of the Written Opinion of the International Search Authority in international application No. PCT/CN2009/076068, mailed on Oct. 8, 2010.

Supplementary European Search Report in European application No. 09852461.4, mailed on Mar. 6, 2014. (5 pages—see entire document).

* cited by examiner

METHOD AND SYSTEM FOR IMPLEMENTING A CALL BY A MEDIA GATEWAY

TECHNICAL FIELD

The present disclosure relates to a calling technology, in particular to a method and a system for implementing a call by a media gateway.

BACKGROUND

Whether in a next generation network (NGN) or an Internet protocol (IP) multimedia subsystem (IMS) network, a media gateway is configured to complete a calling process under the control of soft switch (SS) or a call session control function (CSCF).

With the continuous development and evolution of the NGN, and for the sake of operators' development, user access equipments tend to become smaller, and some small media gateways may be deployed under the NGN or IMS core network equipments. Each media gateway accesses a core network through protocol interfaces such as an H.248 protocol or Session Initial Protocol (SIP) and the like; however, the media gateway and the core network equipment may be out of control due to various reasons, such as protocol interface interruptions.

Presently, although some devices can exchange internally in the case of losing contact with the core network control equipment, the range is only limited within the equipment; however, most calls to other gateways cannot be guaranteed. Although some devices are equipped with escape interfaces, both additional hardware interfaces and additional external network interfaces are needed to be configured, which increases the cost, and increases the complexity of networking and network management.

Particularly, for those important large enterprise network users, conversations within an enterprise should be guaranteed. A large number of users within an enterprise network may belong to a number of different media gateways; if the protocol service interface between a certain media gateway and the core network equipment interrupts, then the media gateway is basically isolated from the enterprise network, therefore, the users of this media gateway cannot communicate with other users of the enterprise network.

SUMMARY

In view of the above, the main purpose of the present disclosure is to provide a method and a system for implementing a call by a media gateway, which can guarantee a normal conversation service of a user a media gateway under the condition that a protocol service interface between the media gateway and a core network equipment is interrupted.

To fulfill the above-mentioned purpose, the technical solution of the present disclosure is realized in the following way:

there is provided a method for implementing a call by a media gateway, the method comprises setting a master control network element in a media gateway cluster, and establishing a mapping relationship between a user number and the media gateway in the master control network element, the method further comprises:

when the media gateway determines that an uplink protocol interface corresponding to a calling party is interrupted, a media gateway acquires a number of a called party and requests the master control network element to determine a media gateway to which the called party belongs according to a number matching result;

the master control network element determines the media gateway to which the called party belongs according to the mapping relationship stored therein, and informs the media gateway initiating the request;

the call between the media gateway as a calling gateway that initiates the request and the determined media gateway to which the called party belongs is completed.

The step of establishing the mapping relationship between the user number and the media gateway may include:

after each media gateway in the media gateway cluster is initiated, reporting user number information within a local media gateway to the master control network element, the master control network element stores the received user number information of all the media gateways in the media gateway cluster locally, and the master control network element establishes the mapping relationship between each user number and the media gateway to which it belongs; or the mapping relationship is pre-configured on the master control network element manually.

The master control network element may be any media gateway in the media gateway cluster, or a server, or a computer, or a network communication equipment.

The step that the media gateway requests the master control network element to determine the media gateway to which the called party belongs may include:

when the calling party is off hook, the media gateway determines whether the uplink protocol interface corresponding to the calling party is interrupted, if interrupted, then the media gateway transmits a dialing tone to the calling party, acquires the called party number, and the media gateway performs a matching analysis on the user number, and after performing a number matching according to a user number matching rule, the media gateway determines whether to inquire an address of the media gateway to which the user number belongs from the master control network element according to a number matching result;

if not interrupted, then the media gateway completes a calling process of the user according to an existing process and the whole procedure is ended.

The step that the master control network element determines the media gateway to which the called party belongs and informs the media gateway initiating the request may include:

after receiving the inquiry request from the media gateway, the master control network element acquires an address of the media gateway corresponding to the called party number according to the established mapping relationship, if the inquiry is successful, then the master control network element transmits an inquiry success response message including the address of the media gateway to which the called party number belongs to the media gateway initiating the request; otherwise, the master control network element transmits an inquiry failure response message to the media gateway initiating the request.

When the media gateway determines that the uplink protocol interface corresponding to the calling party communicates normally, the method may further include: each of the media gateways in the media gateway cluster interacts with a core network equipment independently in an existing manner.

A system for implementing a call by a media gateway, comprising a master control network element and media gateways in a media gateway cluster, wherein the master control network element in which a mapping relationship between a user number and a media gateway is established therein is configured to receive a request from the media gateway for determining a media gateway to which a called party belongs; determine the media gateway to which the called party belongs according to the mapping relationship stored therein and inform the media gateway initiating the inquiry request;

the media gateway is configured to, when it is determined that an uplink protocol interface corresponding to a calling party is interrupted, initiate a self-exchange process, acquire a called party number and perform a number matching, and decide whether to transmit the request to the master control network element for determining the media gateway to which the called party belongs according to a matching result; and receive from the master control network element information about the determined media gateway to which the called party belongs, and serve as a calling gateway to complete the user call with the determined media gateway to which the called party belongs.

The system may further include a core network equipment, wherein, when the media gateway determines that the uplink protocol interface communicates normally, each of the media gateways interacts with the core network equipment independently in an existing manner.

As we can see from the technical solution provided by the disclosure, the technical solution includes: a master control network element is set in a media gateway cluster, and a mapping relationship between a user number and the media gateway in the master control network element is established; when the media gateway determines that an uplink protocol interface corresponding to a calling party is interrupted, the media gateway initiates a self-exchange process, acquires a number of the called party and performs a number matching, and transmits a request to the master control network element for determining the media gateway to which the called party belongs; the master control network element determines the media gateway to which the called party belongs according to the mapping relationship stored therein and informs the media gateway initiating the inquiry request; the media gateway that initiates the inquiry request completes the user call with the determined media gateway to which the called party belongs as a calling gateway. In the method of the present disclosure, under the control of the master control network element, normal conversation services of the users of the media gateway can be guaranteed even if the protocol service interface between the media gateway and the core network equipment is interrupted through the interactions among the media gateways in the media gateway cluster.

DETAILED DESCRIPTION

Figure 1:
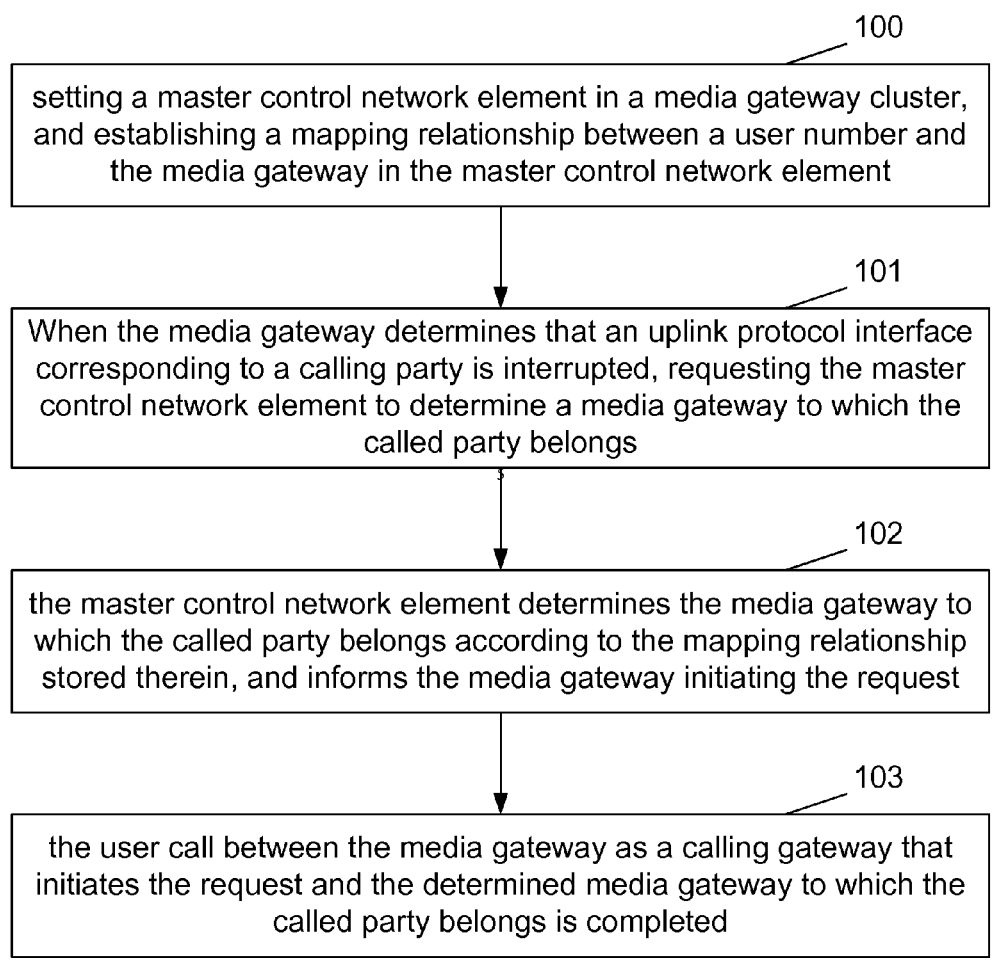
FIG. 1 is a flowchart of a method for implementing a call by a media gateway according the present disclosure.

FIG. 1 is a flowchart of a method for implementing a call by a media gateway according the present disclosure. As shown in FIG. 1, the method comprises:

Step 100: a master control network element is set in the media gateway cluster, and a mapping relationship between a user number and a media gateway is established in the master control network element.

In the step, the master control network element can be a certain media gateway in the media gateway cluster, a certain server, or any other computer or network communication equipment that can communicate, in this step, establishing the mapping relationship between the user number and the media gateway comprises:

after each media gateway in the media gateway cluster is initiated, the user number information in the media gateway is reported to the master control network element; the master control network element locally stores the received user number information of all the media gateways in the media gateway cluster and establishes a mapping relationship between each user number and the media gateway to which the user number belongs; or the mapping relationship can be preconfigured on the master control network element manually.

Step 101: when a media gateway determines that an uplink protocol interface corresponding to a calling party is interrupted, the media gateway initiates a self-exchange process, receives a number of a called party, and requests the master control network element to determine a media gateway to which a called party belongs according to a number matching result, in this step, when a user is off hook, the media gateway determines whether the uplink protocol interface corresponding to the user is interrupted, if it is interrupted, then the media gateway transmits a dialing tone to the user, and acquires the called party number, and inquires the address of the media gateway to which the called party number belongs from the master control network element after performing number matching according to the user number matching rule; at this time, if the called party is a user of the local media gateway, then the call is directly continued within the local media gateway to finish the conversation between the calling party and the called party without inquiring the gateway address to which the user number belongs from the master control network element.

If the uplink protocol interface corresponding to the user is not interrupted, then the media gateway completes the calling process of the user according to an existing process.

Step 102: the master control network element determines the media gateway to which the called party belongs according to the mapping relationship stored therein and informs the media gateway initiating the inquiry request.

in this step, after receiving an inquiry request from the media gateway, the master control network element acquires the address of the media gateway corresponding to the current called party number according to the established mapping relationship. If the inquiry is successful, then the master control network element sends an inquiry success response message having the address of the media gateway to which the called party number belongs to the media gateway initiating the inquiry request; otherwise, the master control network element returns an inquiry failure response is message to the media gateway initiating the request.

Step 103: the call between the media gateway as the calling gateway that initiates the request and the determined media gateway to which the called party belongs is completed.

In this step, when receiving the inquiry success response message, the calling gateway and the called gateway corresponding to the acquired address of the media gateway exchange messages with each other to complete the calling process across the media gateways; when receiving the inquiry failure response message, then a busy tone is transmitted to the calling party until the calling party hangs up; and then the call is finished.

The method of the present disclosure further comprises: in regular conditions, when a media gateway determines that an uplink protocol interface corresponding to a calling party communicates normally, each media gateway independently interacts with the core network equipment according to an existing manner.

In the method of the present disclosure, under the control of the master control network element, normal conversation services of the users of the media gateway can be guaranteed even if the protocol service interface between the media gateway and the core network equipment is interrupted through the interactions among the media gateways in the media gateway cluster.

Figure 2:
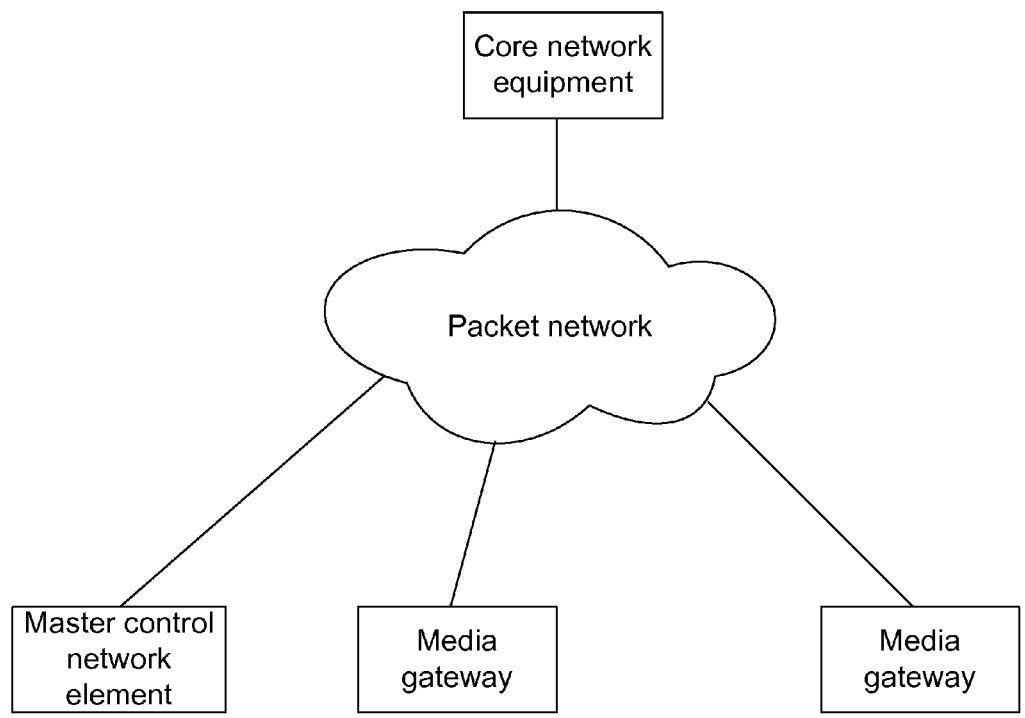
FIG. 2 is a diagram of a composition of a system for implementing a call by a media gateway according the present disclosure.

For the method of the present disclosure, there is also provided with a system. FIG. 2 is a diagram of a composition of a system for implementing a call by a media gateway according the present disclosure. As shown in the FIG. 2, the system mainly includes a master control network element and media gateways in the media gateway cluster, wherein, the master control network element, in which the mapping relationship between the user number and the media gateway is established therein, is configured to receive the request from the media gateway for determining the media gateway to which the called party belongs, and determine the media gateway to which the called party belongs according to the mapping relationship stored therein and inform the media gateway initiating the inquiry request;

the media gateway is configured to, when it is determined that the uplink protocol interface corresponding to the calling party is interrupted, initiate a self-exchange process, transmit a dialing tone to the calling party, acquire the called party number and transmits the request to the master control network element for determining the media gateway to which the called party belongs according to the matching result; receive information from the media gateway to which the called party belongs determined by the master control network element, and serves as the calling gateway to complete a user call with the called media gateway determined by the master control network element.

The system according to the present disclosure further includes a core network equipment, in normal cases (i.e. the media gateway determines that the uplink protocol interface communicates normally), each media gateway independently interacts with the core network equipment according to an existing manner.

Figure 3:
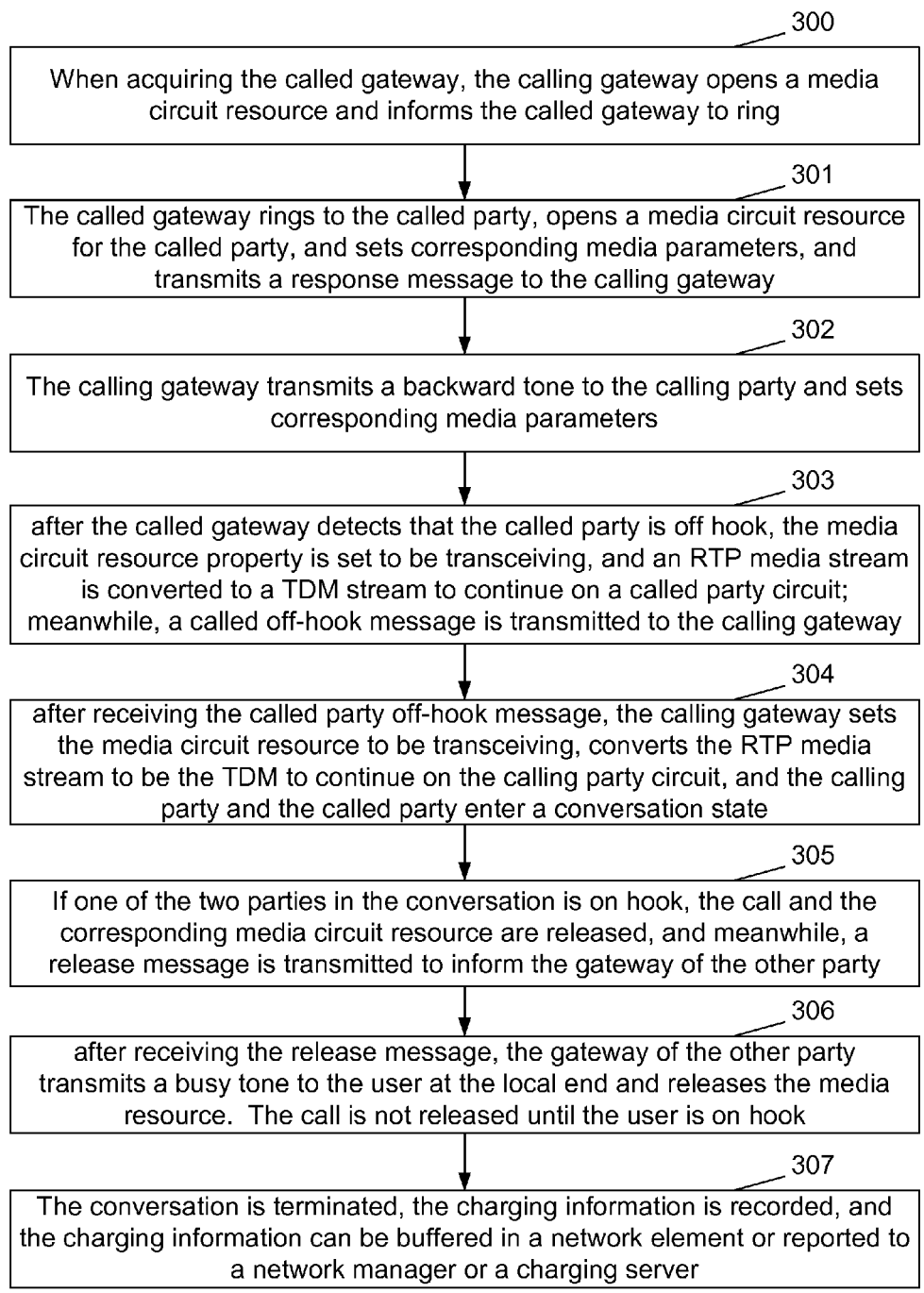
FIG. 3 is a flowchart for implementing a user call between a calling gateway and a gateway to which a called party belongs according to the present disclosure.

FIG. 3 is a flowchart for implementing a user call between a calling gateway and a gateway to which a called party belongs according to the present disclosure. As shown in FIG. 3, Step 103 in FIG. 1 specifically comprises the following steps:

Step 300: after acquiring the called gateway, the calling gateway opens a media circuit resource and informs the called gateway to ring.

after acquiring the called gateway, the calling gateway acquires a media circuit resource and transmits a ringing message to the called gateway, and a calling party circuit identifier, called number information, and an IP address or a port number or the like of a calling media stream are carried in the ringing message.

Step 301: the called gateway rings to the called party, opens a media circuit resource for the called party, sets corresponding media parameters, and transmits a response message to the calling gateway.

when receiving the ringing message, the called gateway finds out the circuit number corresponding to the called party according to the called number, acquires a media circuit resource for the called party, and transmits a response message to the calling gateway, a called circuit identifier, an IP address and a port number of a called media stream are carried in the response message. Meanwhile, the called gateway rings to the called party.

Step 302: the calling gateway transmits a backward tone to the calling party and sets corresponding media parameters, after receiving a called ringing success response message, the calling gateway transmits the backward tone to the calling party, and records information, such as the called party identifier, the IP address and the port number of the media stream of the opposite end in the success response message or the like.

Step 303: after the called gateway detects that the called party is off hook, the media circuit resource property is set to be transceiving, and a RTP media stream is converted to a TDM voice stream to continue on the called party circuit; meanwhile, the called gateway transmits a called party off-hook message to the calling gateway, when the called party is off hook, after detecting the off-hook, the called gateway sets the media circuit resource property to be transceiving, sets the address and the port number of the RTP stream at the opposite end as the IP address and the port number of the calling media stream, and converts the RTP media stream to be the TDM voice stream to continue on the called party circuit; meanwhile, the called gateway transmits the called party off-hook message to the calling gateway.

Step 304: after receiving the called party off-hook message, the calling gateway sets the media circuit resource to be transceiving, converts the RTP media stream to be the TDM to continue on the calling party circuit, and the calling party and the called party enter into a conversation state.

after receiving the called party off-hook message, the calling gateway sets the media circuit resource corresponding to the calling party to be transceiving, sets the address and the port number of the RTP stream at the opposite end as the IP address and the port number of the called media stream, converts the RTP media stream to be the TDM voice stream to continue on the calling party circuit, and the calling party and the called party enter a conversation state.

Step 305: when one of the two parties in the conversation is on hook, then the call and the corresponding media circuit resource are released at first, and meanwhile a release message is sent so as to inform the gateway of the other party.

Step 306: after receiving the release message, the gateway of the other party transmits a busy tone to the user at the local end and releases the media resources; and the call is not released until the user is on hook.

Step 307: the conversation is terminated, the charging information is recorded, and the charging information can be buffered in a network element or reported to a network manager or a charging server. That is to say, at the end of the conversation, a call ticket is generated by the calling gateway, including the calling number, the called number, the conversation time and the end time. The call ticket can be temporarily stored in the gateway or transmitted to the network manager or the charging server.

The above embodiments are only preferred embodiments of the present disclosure and not intended to limit the scope of protection of the disclosure. Any modifications, equivalent replacements, improvements or the like within the principle of the present disclosure shall fall within the protection scope of the present disclosure.

The invention claimed is:

1. A method for implementing a call by a media gateway, comprising setting a master control network element in a media gateway cluster, and establishing a mapping relationship between a user number and the media gateway in the master control network element, the method further comprising:
   acquiring, by the media gateway, a number of a called party and requesting the master control network element to determine a called media gateway to which the called party belongs according to a number matching result, when the media gateway determines that an uplink protocol interface corresponding to a calling party is interrupted;
   determining, by the master control network element, the called media gateway to which the called party belongs according to the established mapping relationship, and informing the media gateway initiating a request; and
   completing a call between the media gateway as a calling gateway that initiates the request and the determined called media gateway to which the called party belongs;
   wherein the step of establishing the mapping relationship between the user number and the media gateway comprises:
   after each media gateway in the media gateway cluster is initiated, reporting user number information within a local media gateway to the master control network element;
   storing, by the master control network element, the received user number information of all media gateways in the media gateway cluster locally; and
   establishing, by the master control network element, the mapping relationship between each user number and the media gateway to which it belongs; or
   pre-configuring the mapping relationship on the master control network element manually.

2. The method according to claim 1, wherein the master control network element is any media gateway in the media gateway cluster, or a server, or a computer, or a network communication equipment.

3. The method according to claim 1, wherein the step that the media gateway requests the master control network element to determine the called media gateway to which the called party belongs comprises:
   when the calling party is off hook, determining, by the media gateway, whether the uplink protocol interface corresponding to the calling party is interrupted;
   if interrupted, transmitting, by the media gateway, a dialing tone to the calling party, acquiring the called party number, performing a matching analysis on the user number, and after performing a number matching according to a user number matching rule, determining whether to inquire an address of the called media gateway to which the user number belongs from the master control network element according to a number matching result;
   if not interrupted, completing, by the media gateway, a calling process of the user according to an existing process, and ending the procedure of implementing a call by the media gateway.

4. The method according to claim 3, wherein if the called party is determined to be a user of the calling media gateway according to the number matching result, performing call connection directly within the calling media gateway to complete a conversation between the calling party and the called party, and ending whole procedure.

5. The method according to claim 4, wherein the step that the master control network element determines the called media gateway to which the called party belongs and informs the media gateway initiating the request comprises:
   after receiving an inquiry request from the media gateway, acquiring, by the master control network element, an address of the called media gateway corresponding to the called party number according to the established mapping relationship;
   if the inquiry is successful, transmitting, by the master control network element, an inquiry success response message including the address of the called media gateway to which the called party number belongs to the media gateway initiating the request;
   otherwise, transmitting, by the master control network element, an inquiry failure response message to the media gateway initiating the request.

6. The method according to claim 3, wherein the step that the master control network element determines the called media gateway to which the called party belongs and informs the media gateway initiating the request comprises:
   after receiving an inquiry request from the media gateway, acquiring, by the master control network element, an address of the called media gateway corresponding to the called party number according to the established mapping relationship;
   if the inquiry is successful, transmitting, by the master control network element, an inquiry success response message including the address of the called media gateway to which the called party number belongs to the media gateway initiating the request;
   otherwise, transmitting, by the master control network element, an inquiry failure response message to the media gateway initiating the request.

7. The method according to claim 1, wherein the step that the master control network element determines the called media gateway to which the called party belongs and informs the media gateway initiating the request comprises:
   after receiving an inquiry request from the media gateway, acquiring, by the master control network element, an address of the called media gateway corresponding to the called party number according to the established mapping relationship;
   if the inquiry is successful, transmitting, by the master control network element, an inquiry success response message including the address of the called media gateway to which the called party number belongs to the media gateway initiating the request;
   otherwise, transmitting, by the master control network element, an inquiry failure response message to the media gateway initiating the request.

8. The method according to claim 1, further comprising: when the media gateway determines that the uplink protocol interface corresponding to the calling party communicates normally, interacting, by each of the media gateways in the media gateway cluster, with a core network equipment independently.

9. A system for implementing a call by a media gateway, comprising a master control network element and media gateways in a media gateway cluster, wherein
   the master control network element in which a mapping relationship between a user number and a media gateway is established therein is configured to receive a request from the media gateway for determining a called media gateway to which a called party belongs; determine the called media gateway to which the called party belongs according to the established mapping relationship and inform the media gateway initiating an inquiry request;

the media gateway is configured to, when it is determined that an uplink protocol interface corresponding to a calling party is interrupted, initiate a self-exchange process, acquire a called party number and perform a number matching, and decide whether to transmit the request to the master control network element for determining the called media gateway to which the called party belongs according to a matching result; and receive from the master control network element information about the determined called media gateway to which the called party belongs, and serve as a calling gateway to complete a user call with the determined called media gateway to which the called party belongs;

wherein establishing the mapping relationship between the user number and the media gateway comprises:

each media gateway in the media gateway cluster is configured to report user number information within a local media gateway to the master control network element after being initiated;

the master control network element is configured to store the received user number information of all media gateways in the media gateway cluster locally and establish the mapping relationship between each user number and the media gateway to which it belongs; or, the mapping relationship is pre-configured on the master control network element manually.

10. The system according to claim 9, further comprising a core network equipment, wherein, when the media gateway determines that the uplink protocol interface communicates normally, each of the media gateways interacts with the core network equipment independently.

* * * * *